United States Patent
Bao et al.

(10) Patent No.: US 11,914,571 B1
(45) Date of Patent: Feb. 27, 2024

(54) OPTIMISTIC CONCURRENCY FOR A MULTI-WRITER DATABASE

(71) Applicant: Amazon Technologies, Inc., Seattle, WA (US)

(72) Inventors: Xiaofeng Bao, Fremont, CA (US); Murali Brahmadesam, Woodinville, WA (US); Yi Ding, Los Altos, CA (US); Niket Goel, Seattle, WA (US); Anurag Windlass Gupta, Atherton, CA (US); Kamal Kant Gupta, Snoqualmie, WA (US); Changan Han, Bellevue, WA (US); Tiffany Jianto, Sunnyvale, CA (US); Tengiz Kharatishvili, Sammamish, WA (US); Saileshwar Krishnamurthy, Palo Alto, CA (US); Bohan Liu, Seattle, WA (US); Saleem Mohideen, Saratoga, CA (US); Punit Rajgaria, Sunnyvale, CA (US); Joseph Andrew Tucek, Palo Alto, CA (US); Alexandre Olegovich Verbitski, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 712 days.

(21) Appl. No.: 15/926,983

(22) Filed: Mar. 20, 2018

Related U.S. Application Data

(60) Provisional application No. 62/590,231, filed on Nov. 22, 2017.

(51) Int. Cl.
  G06F 16/23 (2019.01)
  G06F 16/17 (2019.01)
  G06F 16/176 (2019.01)

(52) U.S. Cl.
  CPC ...... *G06F 16/2315* (2019.01); *G06F 16/1734* (2019.01); *G06F 16/1767* (2019.01)

(58) Field of Classification Search
  None
  See application file for complete search history.

(56) References Cited

U.S. PATENT DOCUMENTS

| | | |
|---|---|---|
| 5,280,612 A | 1/1994 | Lorie et al. |
| 5,452,445 A | 9/1995 | Hallmark et al. |

(Continued)

FOREIGN PATENT DOCUMENTS

| | | |
|---|---|---|
| CA | 2783370 | 7/2011 |
| EP | 1630674 | 3/2006 |

(Continued)

OTHER PUBLICATIONS

"Research on the Data Restoration Technology of Distributed Database System", Sep. 15, 2003, Chinese version.

(Continued)

*Primary Examiner* — Thu N Nguyen
(74) *Attorney, Agent, or Firm* — S. Scott Foster; Kowert, Hood, Munyon, Rankin & Goetzel, P.C.

(57) ABSTRACT

Optimistic concurrency may be implemented for multiple writers to a database. Writes to a database from different writers may succeed unless a conflict is detected at the data store for the database. For detected conflicts, a request to resolve the conflict between writes may be submitted to a primary writer, which may determine and provide a resolution of the conflict to the conflicting writers. The data store may then be updated to commit the selected write identified by the resolution of the conflict.

20 Claims, 13 Drawing Sheets

(56) References Cited

U.S. PATENT DOCUMENTS

| | | | |
|---|---|---|---|
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 5,951,695 A | 9/1999 | Kolovson | |
| 6,041,423 A | 3/2000 | Tsukerman | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,124 B1 | 5/2004 | Koseki et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,287,034 B2 | 10/2007 | Wong et al. | |
| 7,305,386 B2 | 12/2007 | Hinshaw et al. | |
| 7,308,456 B2 | 12/2007 | Friske et al. | |
| 7,328,226 B1 | 2/2008 | Karr et al. | |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,953,710 B2 | 5/2011 | Novik et al. | |
| 7,979,670 B2 | 7/2011 | Saliba et al. | |
| 8,086,650 B1 | 12/2011 | Milford | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,527,462 B1 | 9/2013 | Talius et al. | |
| 9,026,493 B1 | 5/2015 | Weng | |
| 9,047,189 B1 | 6/2015 | Gupta et al. | |
| 9,208,032 B1 | 12/2015 | McAlister et al. | |
| 9,223,843 B1 | 12/2015 | Madhavarapu et al. | |
| 9,230,000 B1 * | 1/2016 | Hsieh | G06F 16/2343 |
| 9,251,195 B2 | 2/2016 | Yamada | |
| 9,280,591 B1 | 3/2016 | Kharatishvili et al. | |
| 9,305,056 B1 | 4/2016 | Gupta et al. | |
| 9,317,213 B1 | 4/2016 | Gupta et al. | |
| 9,460,008 B1 | 10/2016 | Leshinsky et al. | |
| 9,465,693 B2 | 10/2016 | Gupta et al. | |
| 9,501,501 B2 | 11/2016 | Madhavarapu et al. | |
| 9,507,843 B1 | 11/2016 | Madhavarapu et al. | |
| 9,514,007 B2 | 12/2016 | Gupta et al. | |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0225696 A1 | 11/2004 | Wong et al. | |
| 2004/0249869 A1 | 12/2004 | Oksanen | |
| 2006/0020634 A1 | 1/2006 | Huras et al. | |
| 2006/0047626 A1 | 3/2006 | Raheem | |
| 2006/0224636 A1 | 10/2006 | Kathruia et al. | |
| 2008/0010322 A1 | 1/2008 | Lee et al. | |
| 2008/0183973 A1 | 7/2008 | Aguilera et al. | |
| 2008/0294648 A1 | 11/2008 | Lin et al. | |
| 2009/0177671 A1 | 7/2009 | Pellegrini et al. | |
| 2009/0192979 A1 | 7/2009 | Lunde | |
| 2009/0249001 A1 | 10/2009 | Narayanan et al. | |
| 2010/0036861 A1 | 2/2010 | Srihari et al. | |
| 2010/0050172 A1 | 2/2010 | Ferris | |
| 2010/0192131 A1 | 7/2010 | Dolby et al. | |
| 2010/0274750 A1 | 10/2010 | Oltean et al. | |
| 2011/0035548 A1 | 2/2011 | Kimmel et al. | |
| 2011/0060724 A1 | 3/2011 | Chan | |
| 2011/0072217 A1 | 3/2011 | Hoang et al. | |
| 2011/0145201 A1 | 6/2011 | Holst et al. | |
| 2011/0161496 A1 | 6/2011 | Nicklin | |
| 2011/0251997 A1 | 10/2011 | Wang et al. | |
| 2012/0005196 A1 | 1/2012 | Horii | |
| 2012/0011106 A1 | 1/2012 | Reid et al. | |
| 2012/0041899 A1 | 2/2012 | Greene et al. | |
| 2012/0166390 A1 | 6/2012 | Merriman et al. | |
| 2012/0174112 A1 | 7/2012 | Vaidya et al. | |
| 2012/0191648 A1 | 7/2012 | Kuber et al. | |
| 2012/0259889 A1 | 10/2012 | Dinker et al. | |
| 2012/0297073 A1 | 11/2012 | Glover et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0323849 A1 | 12/2012 | Garin, Jr. et al. | |
| 2013/0036281 A1 | 2/2013 | Revah et al. | |
| 2013/0042056 A1 | 2/2013 | Shats et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2015/0100542 A1 | 4/2015 | Li et al. | |
| 2015/0113009 A1 | 4/2015 | Zhou et al. | |
| 2015/0286701 A1 | 10/2015 | Wideman | |
| 2015/0347541 A1 | 12/2015 | Holmes et al. | |
| 2015/0379062 A1 * | 12/2015 | Vermeulen | G06F 16/2358 707/691 |
| 2016/0330180 A1 * | 11/2016 | Egorov | G06F 21/14 |
| 2018/0307853 A1 * | 10/2018 | Mehta | G06F 16/9027 |

FOREIGN PATENT DOCUMENTS

| | | |
|---|---|---|
| JP | H10-254748 | 9/1998 |
| JP | 2005276094 | 10/2005 |
| JP | 2007200182 | 8/2007 |
| JP | 2007-317017 | 12/2007 |
| JP | 2012014502 | 1/2012 |
| JP | 2012507072 | 3/2012 |

OTHER PUBLICATIONS

Oracle: "Triggers-Oracle Database Concepts", Retrieved from URL: https://Web.archive.org/web/20150918220843/ https://docs.oracle.com/cd/B19306_01/server.102/b14220/triggers.htm, retrieved on Jan. 11, 2018, pp. 1-17.

Bratko, A. et al., "Exploiting Structural Information for semi-structured document categorization", Information Processing & Management, dated May 1, 2006, vol. 42, No. 3, pp. 679-694.

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs- Talend Community forum", Retrieved from URL: https//www.talendforge.org/forum/viewtopic.php?id=45580, retrieved on Jan. 10, 2018, pp. 1-3.

Jim Gray, et al., "Transaction Processing: Concepts and Techniques—Chapter 10", In: "The Morgan Kaufmann Series in data management systems", Jan. 1, 1993, pp. 529-582.

Jim Gray, et al., "Transaction Processing: Concepts and Techniques—Chapter 12", In: "The Morgan Kaufmann series in data management systems", Jan. 1, 1993, pp. 631-657.

Mokrane Bouzeghoub, et al., "A Framework for Analysis of Data Freshness", Information Quality in Information Systems, ACM, Jun. 18, 2004, pp. 59-67.

M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.

(56) References Cited

OTHER PUBLICATIONS

Hector Garcia-Molina, et al., "Database Systems—The Complete Book Second Edition—Chapter 18—Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.
"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.
"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL-Query-Result-Set-Caching.htm, pp. 1-7.
"Oracle Database JDBC Developer's Guide and Reference: Chapter 20 Statement and Result Set Caching"downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al."Oracle Database Concepts 10g Release 2 (10.2)" Oct. 2005, pp. 1-542.
Ance Ashdown et al."Oracle Database Concepts 11g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
U.S. Appl. No. 15/369,681, filed Dec. 5, 2016, Anurag Windlass Gupta et al.

* cited by examiner

US 11,914,571 B1

OPTIMISTIC CONCURRENCY FOR A MULTI-WRITER DATABASE

RELATED APPLICATIONS

This application claims benefit of priority to U.S. Provisional Application Ser. No. 62/590,231, entitled "DATABASE WITH MULTIPLE WRITE MASTERS," filed Nov. 22, 2017, and which is incorporated herein by reference in its entirety.

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

While adding additional computing resources can facilitate application scaling, doing so significantly increases the complexity of the distributed system when performing various operations. For example, a database hosted at a distributed system or application may allow multiple different processes implemented at separate computer systems to perform writes to the database. Because multiple writers can write to the database, a distributed concurrency technique may be desirable to ensure that writes are consistently performed across the distributed system.

Figure 1:
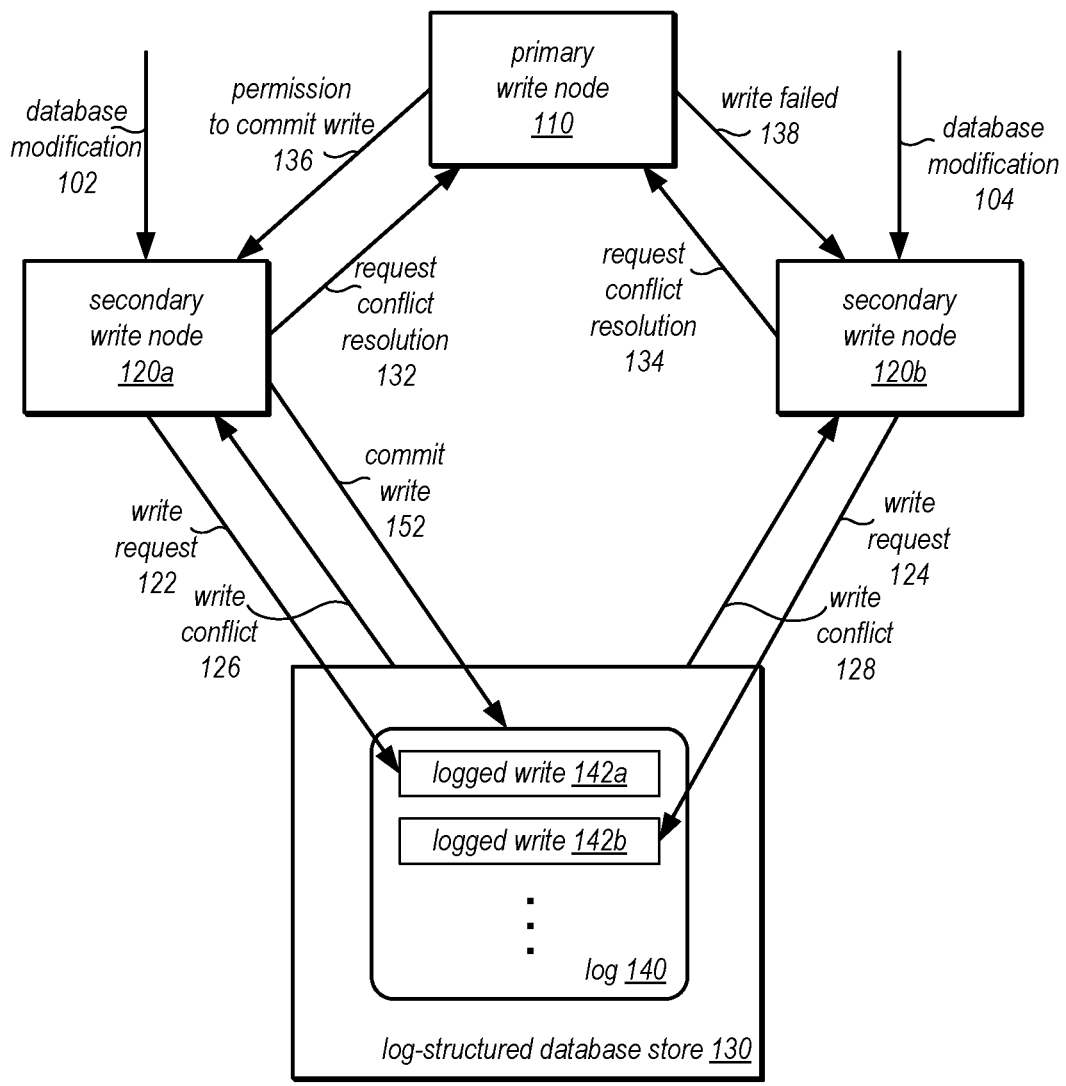
FIG. 1 is a logical block diagram illustrating optimistic concurrency for a multi-writer database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of optimistic concurrency for a multi-writer database, are described herein. Allowing multiple active writers to a database may provide write scale-out support which may be useful to achieve both higher performance and high availability for a database, in some embodiments. For example, multiple writers may increase the number of clients that can perform writes to database, which would make the database more available to clients with a desire to perform writes to the database, in some embodiments. In another example, allowing multiple writers to a database may increase the speed at which individual write requests are performed as a greater number of computing resources (e.g., different servers or hosts for different writers) may be available to process write requests, in some embodiments. Allowing multiple active writers may also improve the performance of various kinds of applications that rely upon the database, in some embodiments. Analytics pipelines, for instance, may be able to avoid sharding by consolidating data into a single database that allows for multiple writers, avoiding synchronization concerns that would otherwise occur in sharded arrangements of data, in some embodiments.

Optimistic concurrency for a multi-writer database may further enhance the various benefits to the operation of host systems and the databases implemented thereon by increasing the speed at which writes can be concurrently performed by different writers to the same database, in some embodiments. In some embodiments, writes to a database from multiple writers will succeed unless a conflict is detected at a log-based data store for the database. Because the log-based data store can determine, infer, or impose a logical ordering on writes to a database so that that writes from different writers are preserved in the log without overwriting one another, conflicts can be detected at the log-based data store, in some embodiments. The log-based data store can indicate, notify, or otherwise signal conflicting writes to database writers, in some embodiments. For those writes that do not conflict, the writers can proceed without further concurrency or resolution techniques, in some embodiments. In scenarios where a conflict is detected, the conflict can be resolved between the two writers that received the indication of the conflict by appealing or otherwise requesting a resolution from a primary write node for the database, in some embodiments. For example, a primary write node can evaluate transaction information, make a random selection, or perform other conflict resolution schemes. A resolution may be provided to the writers so that the successful writer can request the data store to commit their write instead of the other write, in some embodiments. In this way, writes to the database can be optimistically performed, allowing non-conflicting to proceed quickly, in some embodiments FIG. 1 is a logical block diagram illustrating optimistic concurrency for a multi-writer database, according to some embodiments. Log-structured database store 130 may store data on behalf of a database, in some embodiments. The log structured database store may implement both a change log to data, such as log 140, and underlying storage for pages, blocks, or other locations storing database data, in some embodiments. Log 140 may, for example, store records, indications, or other entries that describe changes to the database, by describing changes to pages, blocks, or other locations, in some embodiments (e.g., as discussed below with regard to the separate data storage service in FIGS. 2-5 below or other log-based file systems or stores that log changes to data stored on behalf of an application, such as a database). For example, as illustrated in FIG. 1, log 140 may include multiple logged writes to the database, such as logged writes 142a and 142b, in some embodiments.

Logged writes 142 may be records or other indications which may identify the data page, for example, to which the write is directed. Note that in some embodiments the data page, block, or other location in storage may store multiple different items, records, objects or entries of a database (e.g., multiple rows) and thus a logged write may be a write to one or some of the items, but not all items, in some embodiments. As discussed below with regard to FIG. 10, physical conflicts that are indicated by a write to the same storage location may not incur a logical conflict and thus may allow scenarios where conflicting writes can proceed, in some embodiments.

As illustrated in FIG. 1, multiple writers may be available to access a database. For example, primary write node 110 and one or more secondary write nodes, such as secondary write nodes 120a and 120b may be available to perform write requests. Write nodes may be nodes, engines, or other components capable of receiving and performing access requests (e.g., queries or other requests including requests to update or otherwise modify a database), in some embodiments. For example, write nodes may be database engine head nodes as discussed below with regard to FIGS. 2-7, however other nodes, systems, or components capable of writing to a log-structured data store (e.g., including embodiments where the write nodes are write-only nodes dedicated to performing requests that cause writes to a database) may be implemented instead, in some embodiments.

In the illustrated example of FIG. 1, both secondary write node 120a and secondary write node 120b may receive respective requests to modify the database, data base modification 102 and database modification 104, in some embodiments. Database modifications may be requests submitted according to an application programming interface (API), protocol, or language (e.g., Structured Query Language (SQL)) which may cause one or more writes to a database, in some embodiments. Secondary write node 120a may perform the database modification 102 by submitting, performing, or otherwise making a write request 122 to log-structured database store which may perform the write request by storing a corresponding record in log 140, logged write 142a. Similarly, secondary write node 120b may perform the database modification 104 by submitting, performing, or otherwise making a write request 124 to log-structured database store which may perform the write request by storing a corresponding record in log 140, logged write 142b.

Log-structured data store 130 may detect conflict between the two writes, in some embodiments. For example, log-structured database store 130 may identify both writes as to a same data page or other location in storage and that both occur after a point in a logical sequence for log 140 (e.g., with logical sequence number (LSN) values greater than a point indicating which logged writes in log 140 are committed otherwise consistently applied), in some embodiments. This point in time may, in some embodiments, be determined by the secondary or primary write nodes, which may evaluate what is the latest point in time (or greatest LSN value) for which all write requests have been committed to log-structured database store 130. In some embodiments, log-structured database store 130 may determine the point in time.

Once identified, log-structured database store 130 may provide indications of the write conflicts back to the secondary write nodes 120, as indicated at 126 and 128. One or both secondary nodes 120 may send requests to primary node 110 to resolve the conflict, in some embodiments, as illustrated at 132 and 134. The requests may, for instance, identify the conflicting writes by LSN or other identifier which may provide information by which primary write node 110 may make a conflict resolution. In some embodiments, further information, such as the logical operations to be performed to the database (e.g., which row, entry, item, or object is being changed), in some embodiments.

Figure 10:
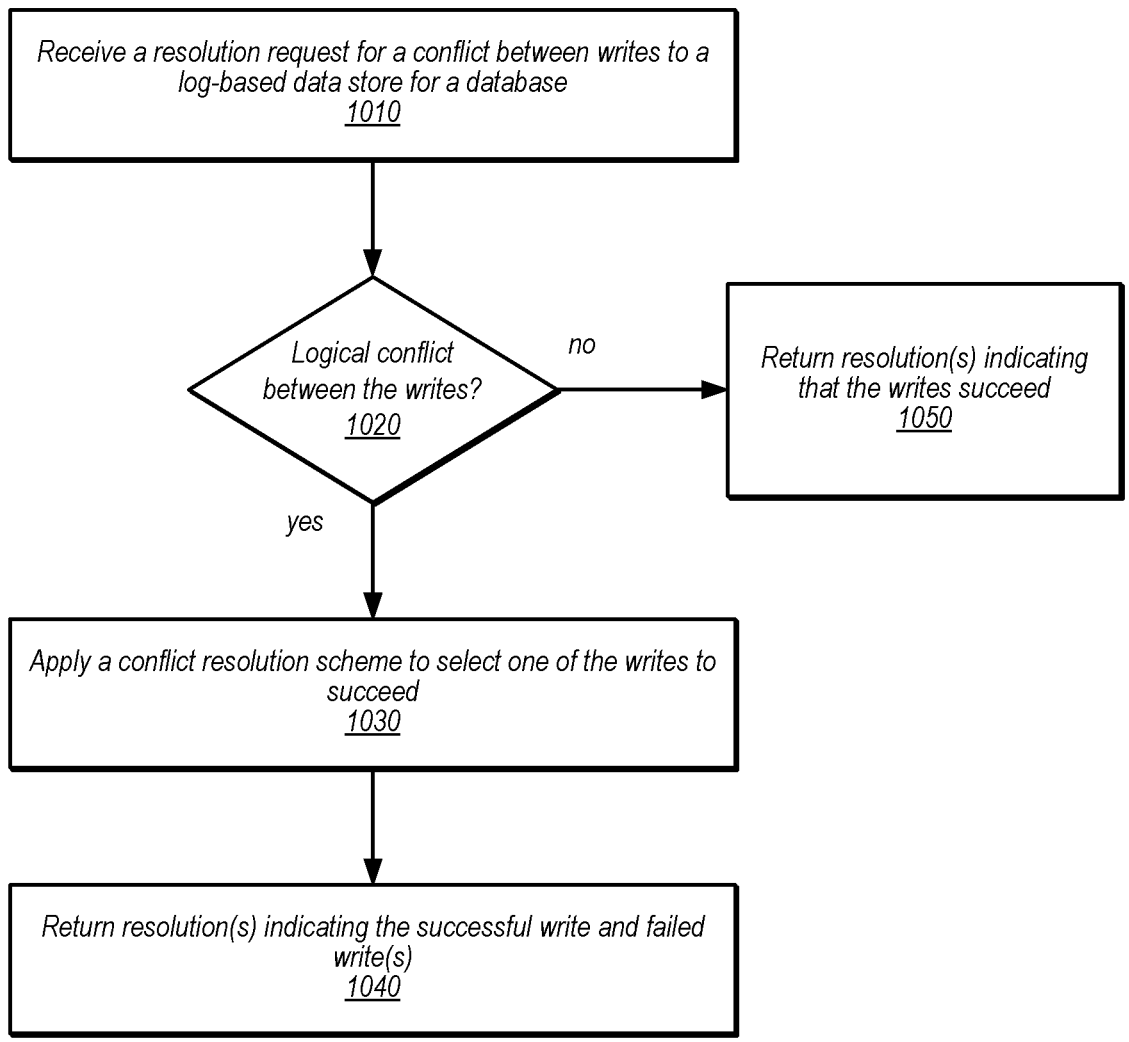
FIG. 10 is a high-level flow chart illustrating methods and techniques for resolving a conflict between multiple writes to database, according to some embodiments.

Primary node, as discussed below with regard to FIG. 10 may select one of the conflicting writes to succeed, in some embodiments. For example, as illustrated in FIG. 1, primary write node 110 may grant secondary write node 120a permission to commit the write indicated by logged write 142a, in some embodiments, while providing an indication 138 that the write indicated by logged write 142b failed to secondary node 120b. In some embodiments, secondary write node 120a may send a request to commit a write 152 to log-structured database store 130 (which may automatically interpret that all conflicting writes are cancelled). In some embodiments (not illustrated), a separate request to cancel failed writes may be performed. In some embodiments, not illustrated, a reconciled version of both write requests 122 and 124 may be performed if the conflict is physical and not logical, as discussed below.

Please note, FIG. 1 is provided as a logical illustration of a log-structured database store, secondary write nodes, primary and primary write nodes is not intended to be limiting as to the physical arrangement, size, or number of components, modules, or devices to implement such features. For example, only a single primary and secondary write node could be implemented. In some embodiments, log-structured database store 130 may be distributed across many different storage nodes, which store respect logs for underlying data stored at the storage node.

The specification first describes an example of a database system as a network-based database service that stores data for a database managed by the database service in a separate data storage service, according to various embodiments. Included in the description of the example network-based database service are various aspects of the example network-based database service along with the various interactions between the database service and the storage service, including interactions to perform optimistic concurrency for a multi-writer database. The specification then describes a flowchart of various embodiments of methods for implementing optimistic concurrency for a multi- writer database. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process. In some embodiments, as discussed below with regard to FIGS. 6-12, conflict detection in order to support multiple writers to a database may be implemented.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In some embodiments, the database systems described herein may retain much of the structure of the upper half of the database instance (e.g., query processing and query optimization) but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations, in some embodiments.

In some embodiments, the database tier of a may include one or multiple a database engine head node servers that receive read and/or write requests from various client programs (e.g., applications) and/or subscribers (users), then parse them and develop a plan to carry out the associated database operation(s). In some embodiments, the database engine head node may manage communications between the database tier of the database system and clients/subscribers, as well as communications between the database tier and a separate distributed storage system.

In some embodiments, a database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system, in some embodiments. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group, in some embodiments. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum that does not indicate that the transaction conflicts with other writes or transactions in storage from another writer. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. A data page held in this cache may not ever be flushed to the storage layer, and it may be discarded at any time (e.g., at any time after the redo log record for a write request that was most recently applied to the cached copy has been sent to the storage layer and acknowledged), in some embodiments. The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance.

Therefore, there may be no cache coherency or consistency issues to manage. Instead, cache invalidation communications may be sent between multiple to writers to indicate changes to data which may result in the invalidation of a page in the cache of another writer at another node, in some embodiments. For example, in some embodiments, the client-side driver of one database engine head node may notify the client-side driver in other database engine head nodes about updates and/or invalidations to cached data pages (e.g., in order to prompt them to invalidate their caches, after which they may request updated copies of updated data pages from the storage layer), as discussed below with regard to FIG. 6.

In some embodiments, the client-side driver running on a database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained), in some embodiments. For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client-side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may determine the one or more nodes that are implementing the storage for the targeted data page, and to route the redo log record(s) specifying that change to those storage nodes. The storage nodes may then be responsible for applying the change specified in the redo log record to the targeted data page at some point in the future if the change is identified as committed, as discussed above with regard to FIG. 1 or below with regard to FIGS. 7-12.

As writes are acknowledged back to the client-side driver, indications of whether the writes conflict with other writes received from other writers may be included. If, for instance, the indications acknowledge that the write was received but also acknowledge that the write conflicts, then a resolution of the conflict may need to be obtained from a primary database engine head node before the write can be committed (or cancelled). As writes are committed, the client-side driver may advance the point at which the volume is durable and may acknowledge commits back to the database tier, in some embodiments. As previously noted, in some embodiments, the client-side driver may not ever send data pages to the storage node servers. This may not only reduce network traffic, but may also remove the need for the checkpoint or background writer threads that constrain foreground-processing throughput in previous database systems. In other embodiments data pages could be exchanged between database engine head nodes and a data store while implementing optimistic concurrency for a multi-writer database.

In some embodiments, many read requests may be served by a database engine head node cache. However, write requests may require durability, since large-scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
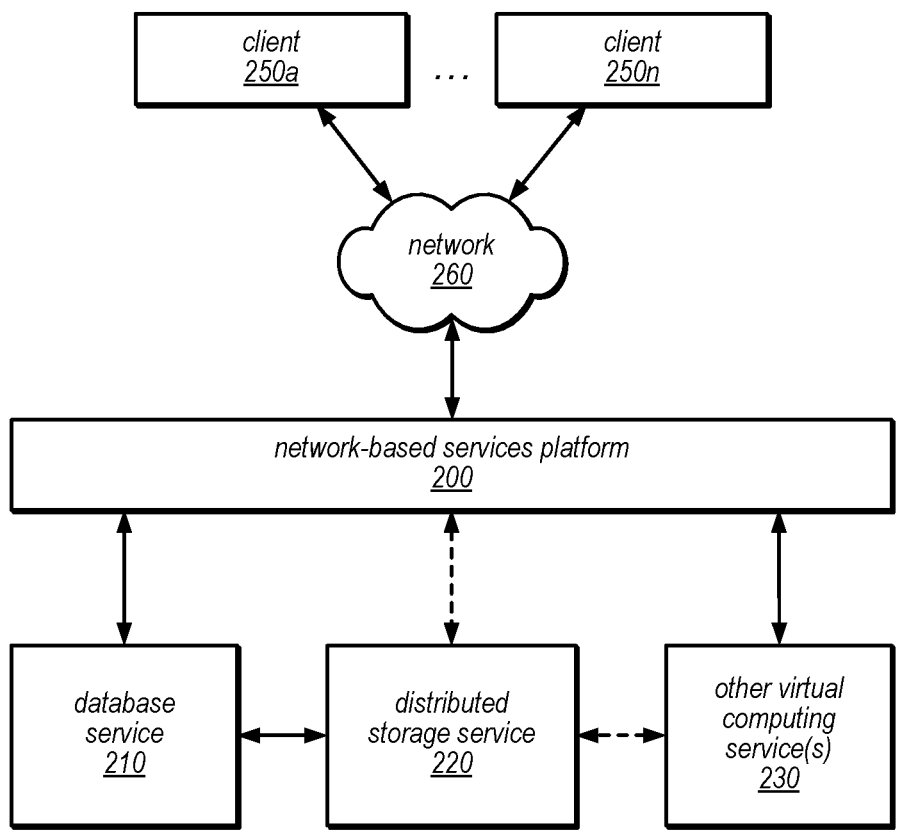
FIG. 2 is a block diagram illustrating a service system architecture that implement a database service that provides optimistic concurrency for multiple writers to a database hosted in the service, according to some embodiments.

FIG. 2 is a block diagram illustrating a service system architecture that may implement a database service that provides optimistic concurrency for multiple writers to a database hosted in the service, according to some embodiments. In the illustrated embodiment, a number of clients (shown as clients 250a-250n) interact with a web services platform 200 via a network 260. Web services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 2000 embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module that may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application that interacts directly with web services platform 200. In some embodiments, client 250 may generate web services requests according to a Representational State Transfer (REST)-style web services architecture, a document- or message-based web services architecture, or another suitable web services architecture.

In some embodiments, a client 250 (e.g., a database service client) may provide access to web services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, query, write, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, web services platform 200 may implement one or more service endpoints to receive and process web services requests, such as requests to access data pages (or records thereof). For example, web services platform 200 may include hardware and/or software to implement a particular endpoint, such that an HTTP-based web services request directed to that endpoint is properly received and processed. In one embodiment, web services platform 200 may be implemented as a server system to receive web services requests from clients 250 and to forward them to components of a system that implements database service 210, distributed storage service 220 and/or another virtual computing service 230 for processing. In other embodiments, web services platform 200 may be implemented as a number of distinct systems (e.g., in a cluster topology) implementing load balancing and other request management features to dynamically manage large-scale web services request processing loads. In various embodiments, web services platform 200 may support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, platform 200 may also implement user authentication and access control procedures. For example, for a given web services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding web services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through web services platform 200 to provide storage of databases or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may receive storage services from distributed storage service 220 (e.g., through an API directly between the virtual computing service 230 and storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Figure 3:
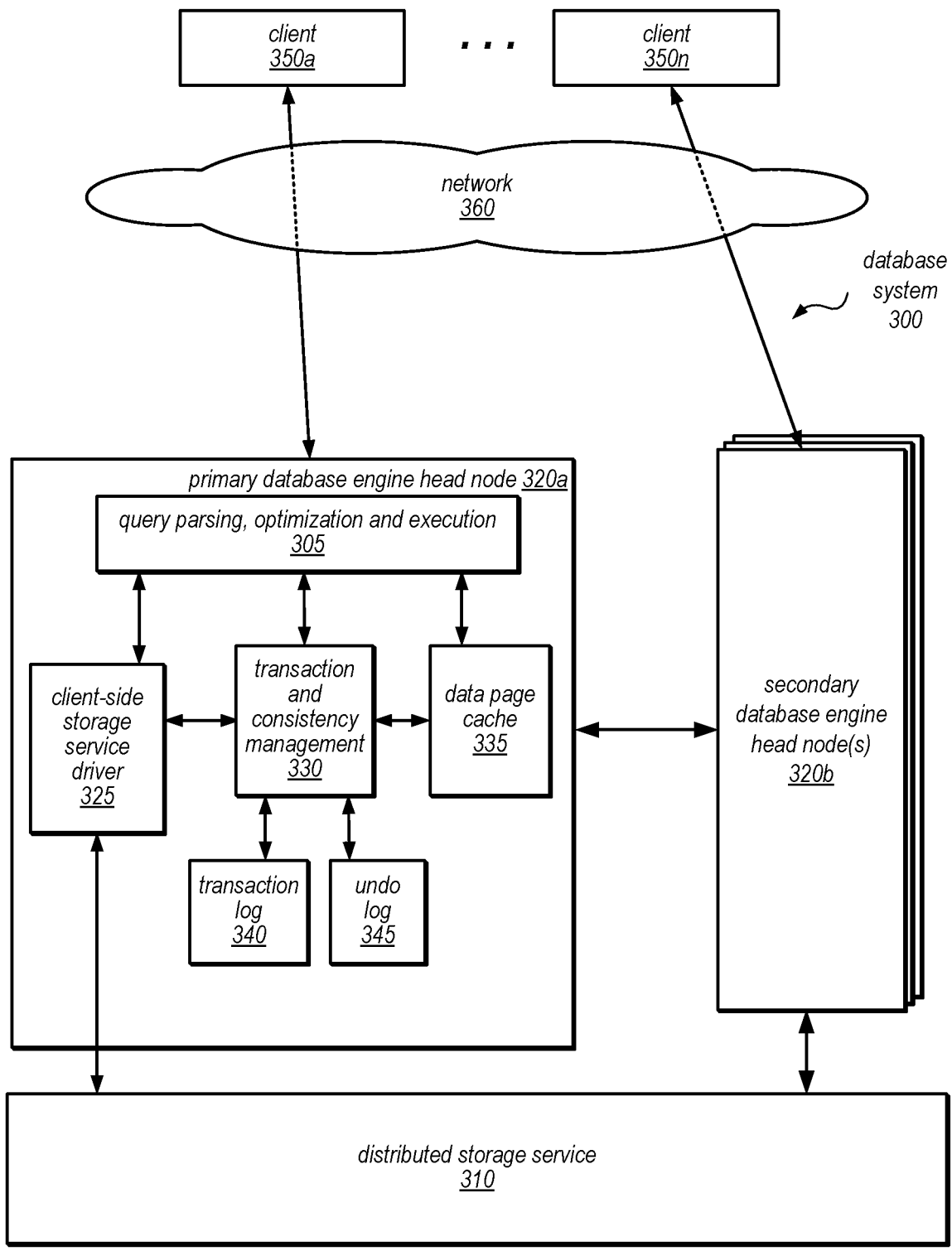
FIG. 3 is a block diagram illustrating various components of a database system that includes multiple database writers and a separate distributed database storage service, according to some embodiments.

FIG. 3 is a block diagram illustrating various components of a database system that includes multiple database writers and a separate distributed database storage service, according to some embodiments. In this example, database system 300 includes one or multiple respective database engine head nodes 320 for each of several databases and a storage service 310 (which may or may not be visible to the clients of the database system, shown as clients 350a-350n). For example, primary database engine head node 320a may serve as a primary access point for providing read and write access to a database. Primary database engine head node 320a may also serve, in some embodiments, as a coordination and/or resolution point for other database engine head nodes (e.g., as part of transaction and consistency management 330), such as secondary database engine head nodes) 320b, which may also perform writes to the database, in some embodiments. As illustrated in this example, one or more of clients 350a-350n may access a database head node 320 (e.g., primary head node 320a, or secondary head node(s) 320b, each of which may be a component of a respective database instance) via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, distributed storage service 310 may perform various storage, access, change logging, recovery, log record manipulation, and/or space management operations in a manner that is invisible to clients 350a-350n.

As previously noted, each database instance may include a one or multiple database engine head nodes 320 that receives requests (e.g., requests that cause writes such as update or insert requests, etc.) from various client programs (e.g., applications) and/or subscribers (users), then parses them, optimizes them, and develops a plan to carry out the associated database operation(s). In the example illustrated in FIG. 3, a query parsing, optimization, and execution component 305 of primary database engine head node 320a may perform these functions for queries that are received from database client 350a and that target the database instance of which primary database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which primary database engine head node 320a is a component. For example, this component may be responsible for ensuring the Atomicity, Consistency, and Isolation properties of the database instance and the transactions that are directed that the database instance, such as applying undo log records to generate prior versions of tuples of a database in order to roll back changes not visible for performing a query. As illustrated in FIG. 3, database engine head node 320a may also include a transaction log 340 and an undo log 345, which may be employed by transaction and consistency management component 330 to track the status of various transactions and roll back any results of transactions that do not commit.

Note that each of the other database engine head nodes 320 illustrated in FIG. 3 (e.g., 320a and 320b) may include similar components and may perform similar functions for queries received by one or more of clients 350a-350n and directed to the respective database instances of which it is a component.

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an storage device; rather there may be an allocation map in each storage device describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

Figure 4:
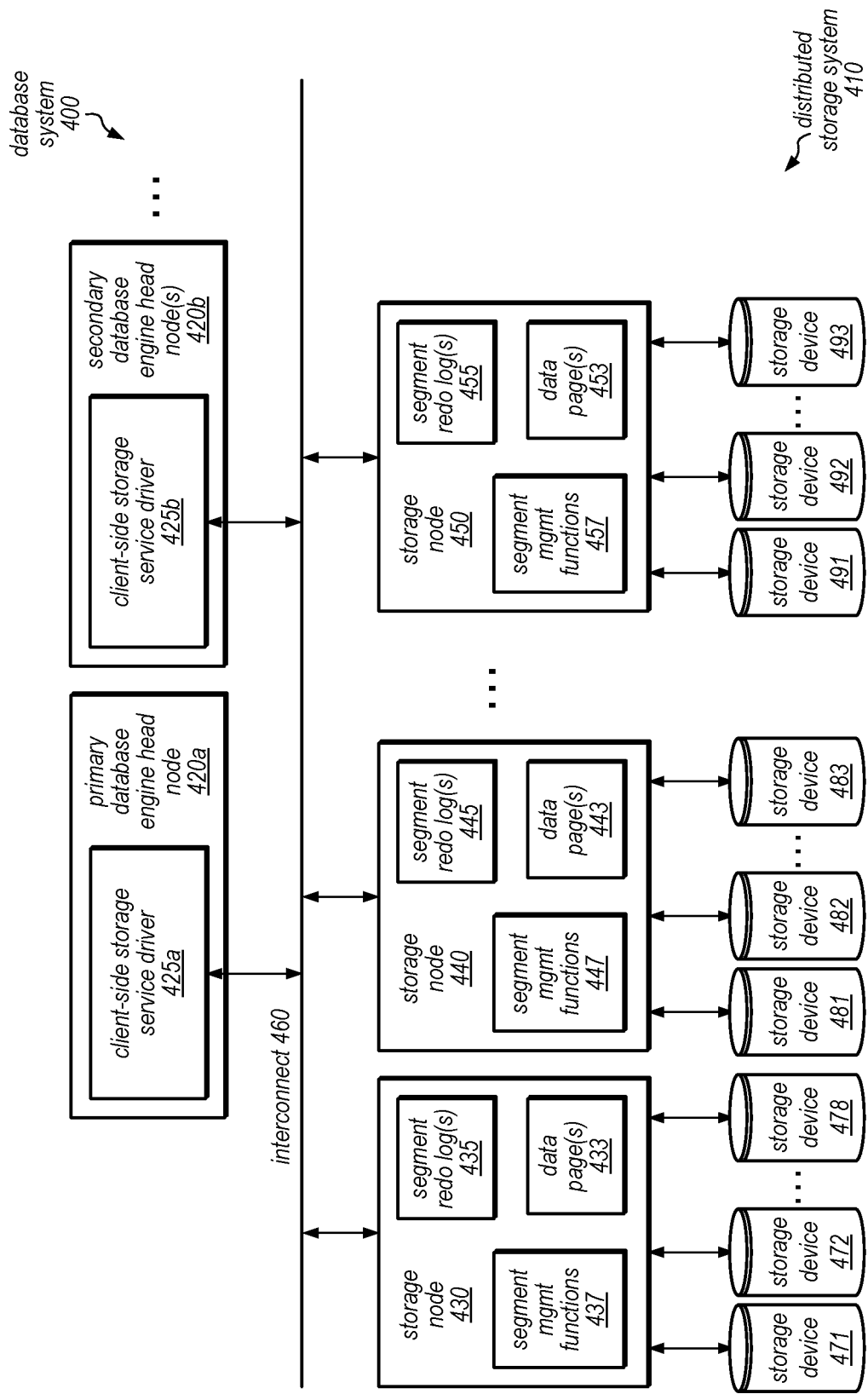
FIG. 4 is a block diagram illustrating a distributed storage system, according to some embodiments.

One embodiment of a distributed storage system that may implement a storage service (or other separate storage system for a database) is illustrated by the block diagram in FIG. 4. In this example, a database system 400 can access a distributed storage system 410, which communicates with a database engine head nodes 420a and 420b over interconnect 460. As in the example illustrated in FIG. 3, database engine head nodes 420a and 420b may include respective client-side storage service drivers 425a and 425b. In this example, distributed storage system 410 includes multiple storage nodes (including those shown as 430, 440, and 450), each of which includes storage for data pages and redo logs for the segment(s) it stores, and hardware and/or software to perform various segment management functions. For example, each storage node may include hardware and/or software to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, query processing operations and/or space management (e.g., for a segment), and conflict detection for changes stored in segment redo logs. Each storage node may also have multiple attached storage devices (e.g., SSDs) on which data blocks may be stored on behalf of clients (e.g., users, client applications, and/or database service subscribers), in some embodiments. In various embodiments, storage nodes may be multi-tenant storing data on behalf of different users accounts or databases as part of distributed storage service 220 (e.g., storing different segments for different databases on attached storage devices at a same storage node).

In at least some embodiments, storage nodes may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In the example illustrated in FIG. 4, storage node 430 includes data page(s) 433, segment redo log(s) 435, segment management functions 437, and attached storage devices 471-478. Similarly, storage node 440 includes data page(s) 443, segment redo log(s) 445, segment management functions 447, and attached storage devices 481-488; and storage node 450 includes data page(s) 453, segment redo log(s) 455, segment management functions 457, and attached storage devices 491-498.

In some embodiments, each of the storage nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
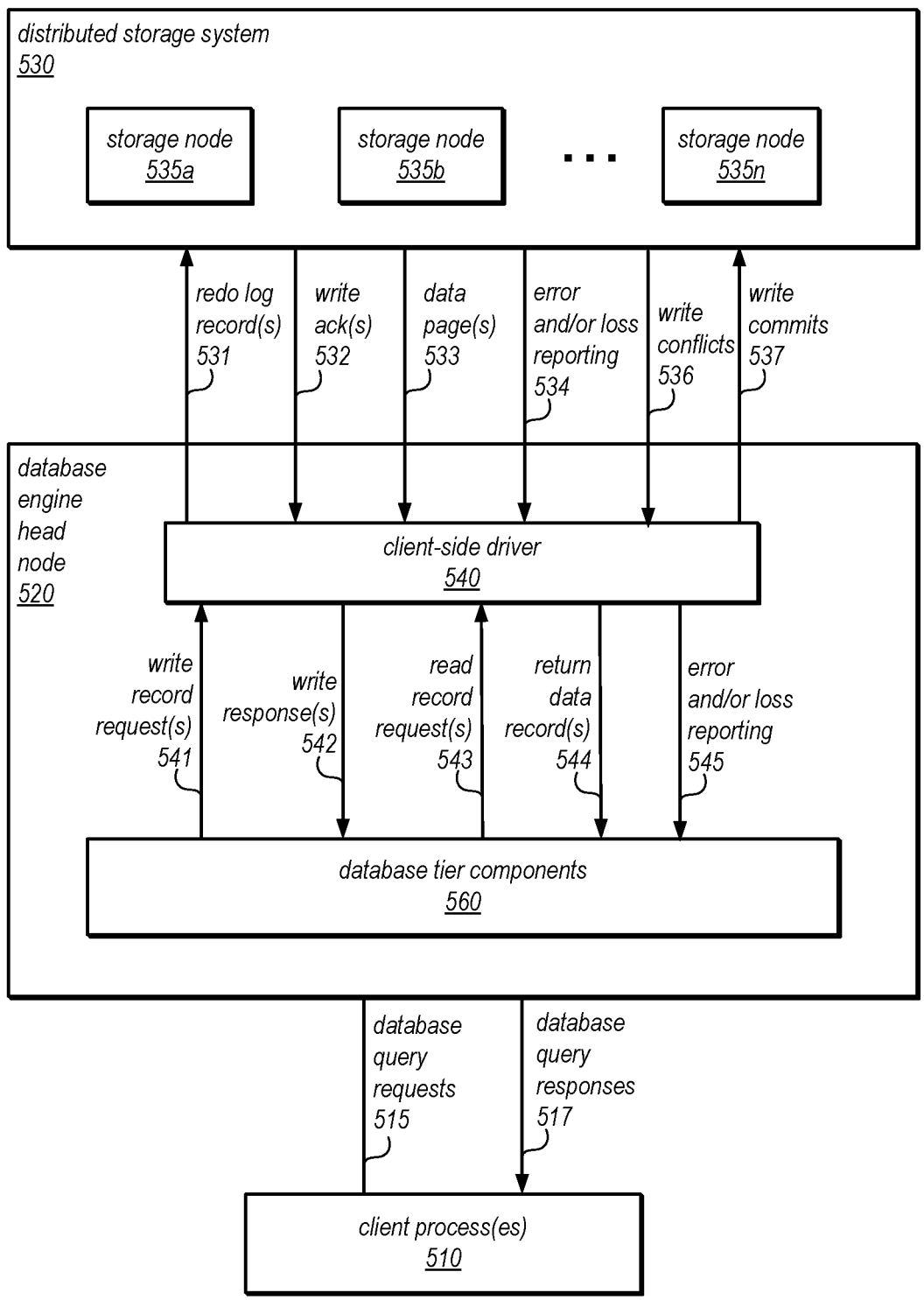
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine head node 520 (e.g., similar to FIG. 3 above) and a distributed storage system 530. In the example illustrated in FIG. 5, database engine head node 520 includes database tier components 560 (e.g., similar to the various features discussed above with regard to FIG. 3) and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine head node 520 (specifically to client-side driver 540). In some embodiments, storage nodes 535 may return write conflicts 536 (although in other embodiments write conflicts 536 may be included or not as part of write acknowledgements 532). For example, write conflicts may indicate writes that were successfully received and logged, but not committed as they conflict with other writes. Write commits 537 may be sent to indicate which conflicting writes can be committed, in some embodiments. In some embodiments, not illustrated, requests to cancel or otherwise exclude writes may be sent or requests to store one or more different log records that reconcile writes instead of previously stored log records (that individual reflect the reconciled writes) may be sent. Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine head node 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine head node 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-537 of distributed storage system 530 and the APIs 541-545 of client-side driver 540 may expose the functionality of the distributed storage system 530 to database engine head node 520 as if database engine head node 520 were a client of distributed storage system 530. For example, database engine head node 520 (through client-side driver 540) may write redo log records or request data pages through these APIs to perform (or facilitate the performance of) various operations of the database system implemented by the combination of database engine head node 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached storage devices. In some embodiments, distributed storage system 530 may provide high durability for stored data block through the application of various types of redundancy schemes.

Note that in various embodiments, the API calls and responses between database engine head node 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 520 and/or distributed storage system 530.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality.

In various embodiments, multiple writers implemented at different respective database engine head nodes may be allowed to access a same database while maintaining a single, global read view of the database. Optimistic concurrency may be implemented for writes performed by the different writers using shared storage and asynchronous I/O, in various embodiments. In some embodiments, database engine head nodes (or other write nodes) may be seamlessly added or removed for a database without disruption of database clients, as discussed below with regard to FIG. 10.

A primary write node (e.g., a primary database engine head node) and one or more secondary write nodes (e.g., one or more secondary database engine head nodes) may be employed, in various embodiments. Write nodes may use an asynchronous write model to achieve higher write performance with reasonable cost to read performance, as discussed above with regard to FIG. 5. Moreover, applying optimistic concurrency techniques may allow the write node, for instance, when writing a log record to continue performing other requests without waiting for the write of the log record to the log to be finalized or to be resolved on a conflict, in some embodiments.

In at least some embodiments, the isolation level supported by multiple writers may include a read-uncommitted isolation level. In some embodiments, the isolation level supported by multiple writers may include a repeatable read isolation level and/or a read-committed isolation level. In such scenarios, isolation may perform the same as if the database only had a single writer when the transactions affecting the rows are on the same instance, in some embodiments. Transactions issued to different instances may have snapshot isolation applied so that the first committed rule is applied and transactions that run into conflicts are aborted, in some embodiments. Different outcomes for such isolation levels may result depending on transaction origin (e.g., a transaction issued on the same write node may succeed where the same transaction issued on another write node would fail), in some embodiments. In some embodiments, a serializable isolation level may not be supported with multiple writers.

Figure 6:
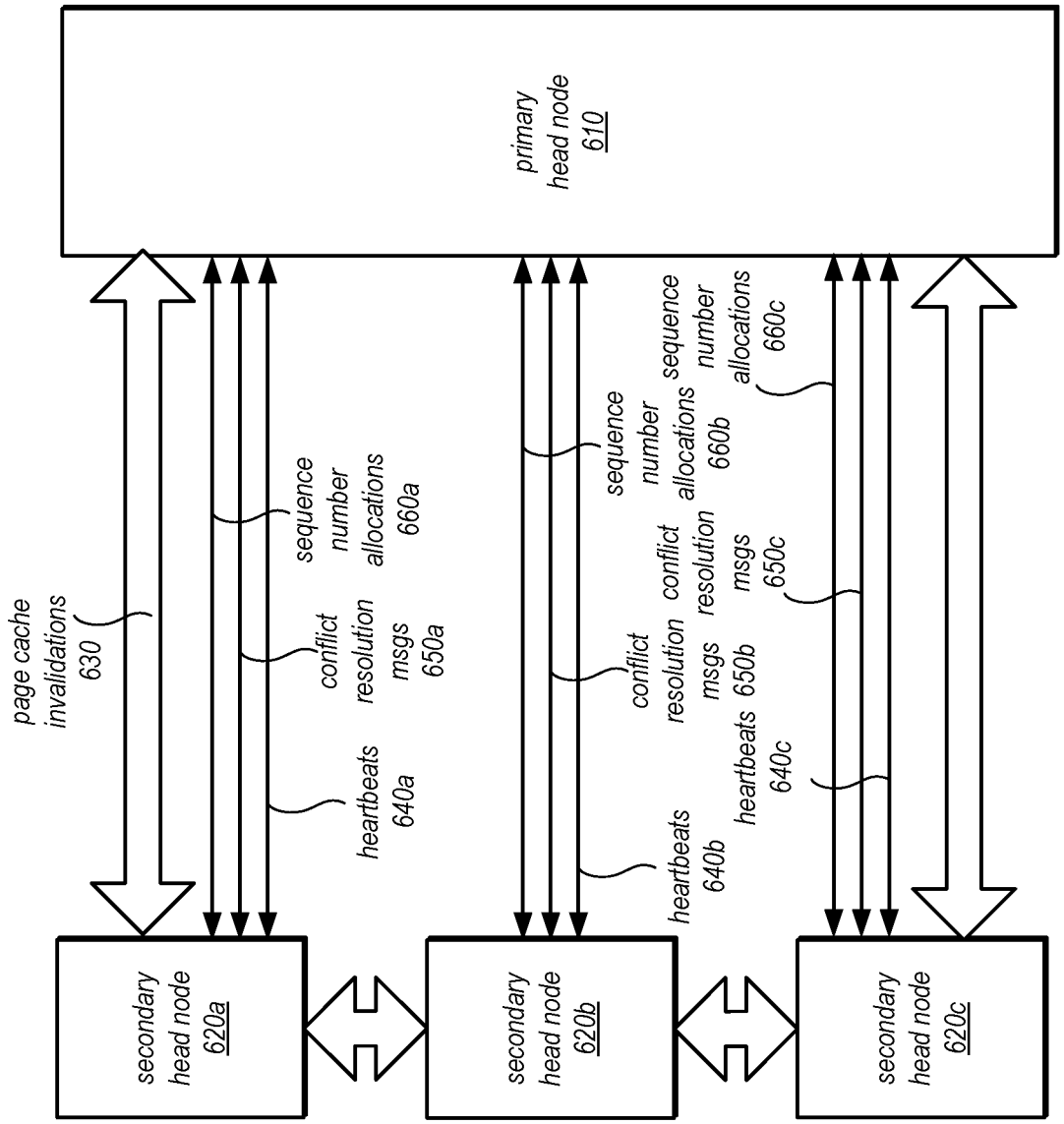
FIG. 6 is a block diagram illustrating interactions between writers to a same database, according to some embodiments.

Various communications may be implemented between write nodes in order to implement optimistic concurrency. FIG. 6 is a block diagram illustrating interactions between writers to a same database, according to some embodiments. One such interaction is page cache invalidations. As illustrated in FIG. 6, multiple secondary head nodes 620a, 620b, and 620c, may share page cache invalidations 630 both with other secondary nodes 620 and primary head node 610 (e.g., secondary head node 620a may send invalidations 630 to secondary head nodes 620b and 620c and to primary head node 610). For example, head nodes may send indications, payloads, or other communications to other head nodes which indicate data pages (or other information) stored in a page cache (e.g., data page cache 335 in FIG. 3) that are no longer valid values as a result of a write performed at the sending head node. In this way, other storage nodes may not rely upon the values of items of the database stored in the page cache to perform a read or write request. Instead, the head node may send a read request to the separate storage system, as illustrated in FIG. 5, to obtain a current version of the invalidated page, in some embodiments.

In some embodiments, secondary head nodes 620 may send respective heartbeats, as indicated at 640a, 640b, and 640c, or other status/liveness communications.

For example, the heartbeat 640 may include an indication lowest LSN which has not been committed yet by the secondary head node 620 (e.g., committed to a quorum of storage nodes). Primary head node 630 may identify the lowest LSN out of the LSNs submitted by the head nodes 620 (and may include a global lowest LSN value of those committed by the primary head node 630) and return the global lowest LSN as part of the heartbeat communications 640 so that each secondary head node could know that any write or transaction with an associated LSN value less than the global lowest LSN could be safely committed. In the event that a secondary head node has not performed writes, the secondary head node would still receive the global LSN and could progress when next performing a write, in some embodiments.

In some embodiments, the logical ordering for writes to the log-based data store (e.g., distributed storage systems and services discussed above with regard to FIG. 4) may apply or impose an ordering for writes to a log stored in the log-based data store. For example, when a redo log record is sent to be stored at one or more storage nodes as discussed above with regard to FIG. 5, the redo log may be assigned or associated with an LSN value by the database engine head node that sent the redo log record to be stored. In some embodiments, primary head node 630 may coordinate the assignment, allocation, or partitioning of different ranges of the logical ordering for the log in the log-based data store according to one or more sequence number allocation communications, as indicated at 660a, 660b, and 660c. For example, a total number of head nodes (secondary and primary) for the database may be identified as a stride width. Each of the head nodes may be assigned a position within the group of head nodes and an identifier (e.g., which may be assigned when the head node is registered with a primary node as discussed below with regard to FIG. 10), in some embodiments. LSN values may then be partitioned based on the stride width, stride position and identifier, in some embodiments. For example, LSN values may be partitioned by stride width on the low bits of the LSN values. A head node with (identifier/stride position) *N may use sequence numbers continuously as k*stride width+N, (k+1)*stride width+N and so on, in some embodiments. In some embodiments, LSN assignments or allocation may use Lamport clocks. In such a scenario, each write node may send its highest allocated sequence number to the primary head node. The primary head node may calculate and return the highest allocated sequence number for accessing the database to the node for a next round sequence number allocation, in some embodiments.

In some embodiments, secondary head nodes 620 may send respective conflict resolution messages, as indicated at 650a, 650b, and 650c, or other status/liveness communications. As discussed above with regard to FIG. 1 and below with regard to FIGS. 8 and 10, primary head node 610 may resolve both possible (e.g., physical conflicts) and actual (e.g., logical conflicts) according to various conflict resolution schemes. Communications to indicate successful or failed writes may be exchanged between secondary head nodes 620 and primary head node 610, in some embodiments.

Figure 7:
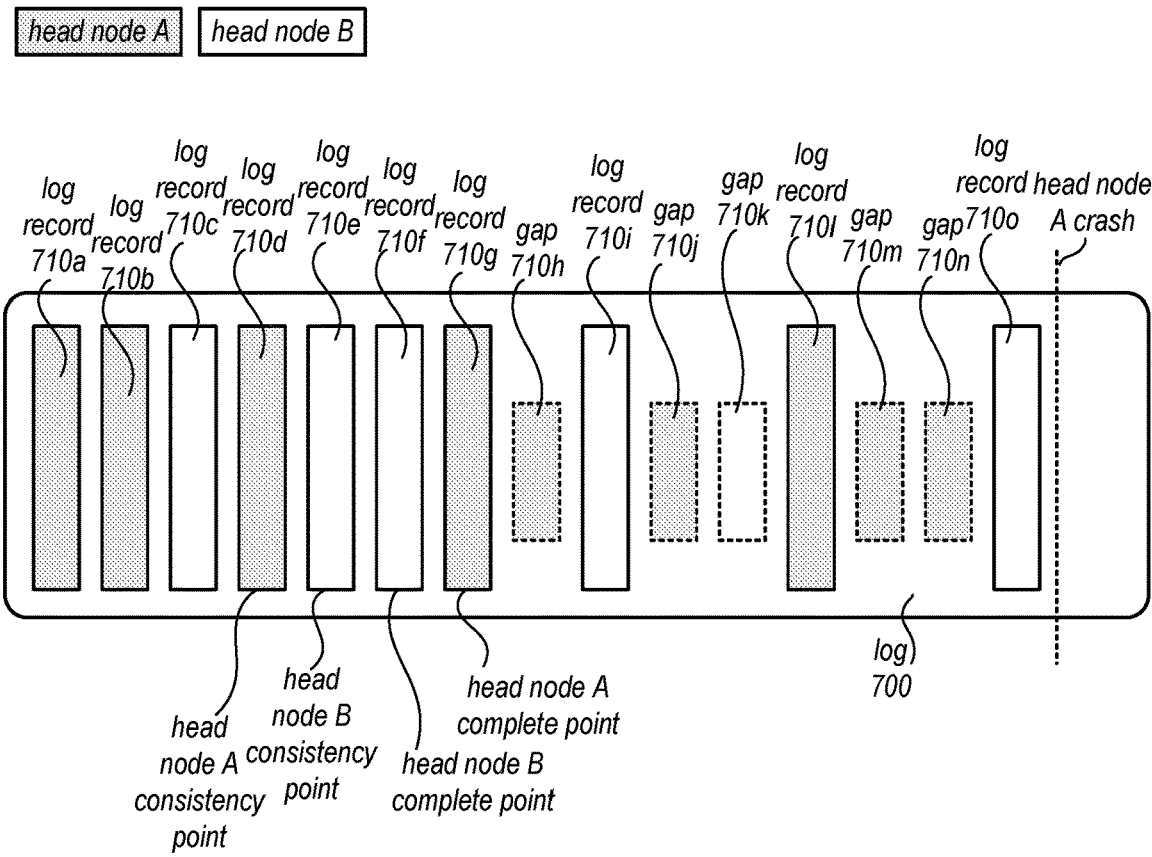
FIG. 7 is a logical block diagram illustrating recovery point determination in a log for a database written by multiple writers, according to some embodiments.
Figure 7:
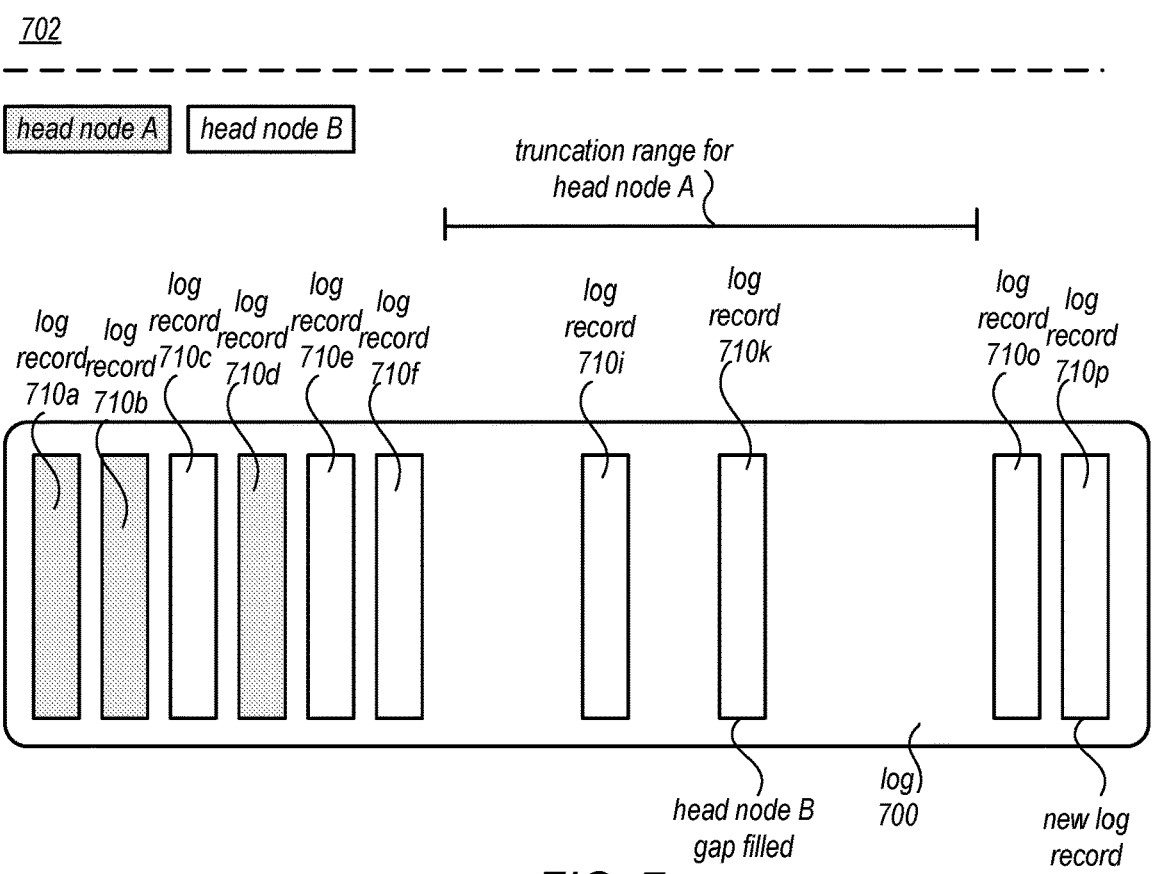

Because multiple writers can write to the log-based data store for a database optimistically, failures of writers can happened before it is determined whether writes are committed to the log-based data store. Therefore, recovery techniques for handling the failures of individual writes may be performed in order to ensure that a consistent view of the database is provided in the event of a failure of one or more of the head nodes. As discussed below with regard to FIGS. 12A and 12B, node failure may rely upon determining recovery points and truncation ranges. FIG. 7 is a logical block diagram illustrating recovery point determination in a log for a database written by multiple writers, according to some embodiments.

Log 700 may be a log stored for a database volume as discussed above with regard to FIG. 4 (e.g., a redo log for a segment of a database). As illustrated in scene 702, two different writers, head node A and head node B may write to the database, storing respective log records to log 700 to indicate changes to the database (e.g., log records 710*a*, 710*b*, 710*d*, 710*g*, and 710*l* for head node A and log records 710*c*, 710*e*, 710*f*, 710*i*, and 710*o* for head node B). Gaps in the log may be indicated by gaps in the backward links of log records or gaps in LSNs for a head node, in some embodiments. For example, log record 710*f* may point to log record 710*e*, which may point to log record 710*c* for head node A. A gap, however, as indicated at 710*k* for head node B may be identified (e.g., as a link from log write record 710*o* may point to a log record that is not yet stored in log 700). Similarly, gaps for head node A, such as gaps 710*h*, 710*j*, 710*m* and 710*n* may be identifiable, in some embodiments.

As illustrated in scene 102, head node A may crash. In order to determine what records should be included in a consistent post-crash view of the database as described by log 700. In order to determine the consistent post-crash view of the database, a last committed log record, and thus last committed change, may be identified, in some embodiments. Completion points may be used to identify a last committed log record, in some embodiments. Completion points may indicate points in the chain of log records stored in log 700 for each head node, in some embodiments. For example, head node A complete point may be log record 710*g* as no gaps may exist before the point in the chain of log records written by head node A. Similarly, for head node B log record 710*f* may be the complete point for head node B. While the complete point for head nodes A and B indicate a last stored write, a last committed log record in log 700 (for each head node) may indicate a consistent view of the database. Thus, as illustrated in FIG. 7, consistency points may be identified. For example, head node consistency point for head node A may be the latest committed record before the complete point for head node A (e.g., log record 710*d*).

Once identified, a complete point may be used to identify what log records can be visible in log 700, in various embodiments. For example, as illustrated in scene 704, a truncation range may be applied to remove, ignore, or otherwise exclude from consideration those log records that occur within the truncation range (which may be all log records after the completion point 710*d* for head node A, excluding log records 710*g* and 710*l*, and gaps for other log records from database head node A, 710*h*, 710*j*, 7101*m*, and 710*n*) when performing reads to the database. For example, a new version of a data page generated in response to a read request for a data page may not apply or include log records within the truncation range.

Figure 8:
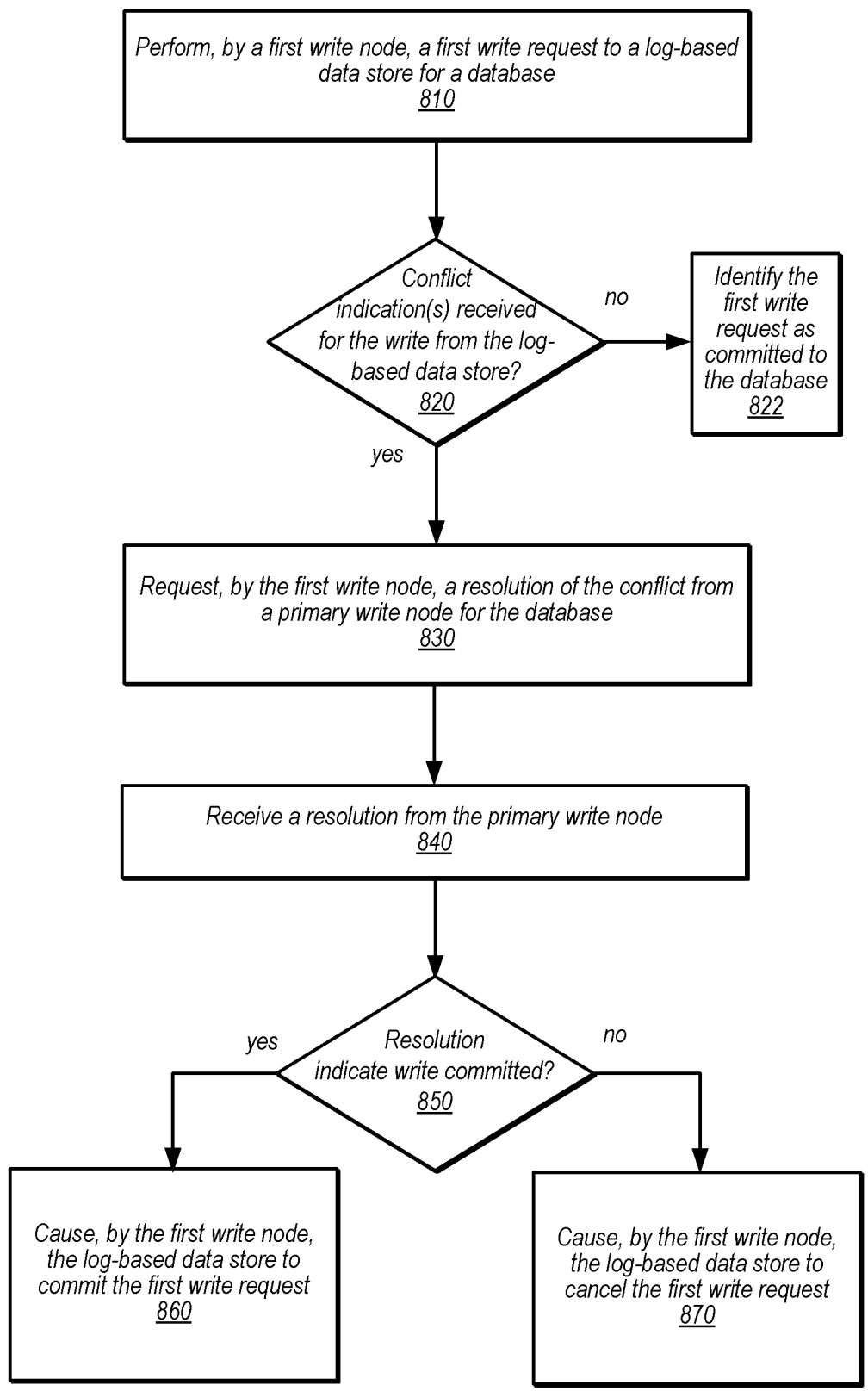
FIG. 8 is a high-level flow chart illustrating methods and techniques for optimistic concurrency for a multi-writer database, according to some embodiments.

The database service and storage service discussed in FIGS. 2 through 7 provide examples of a system that may perform optimistic concurrency for a multi-writer database. However, various other types of database systems or storage systems may implement optimistic concurrency for a multi-writer database. FIG. 8 is a high-level flow chart illustrating methods and techniques for optimistic concurrency for a multi-writer database, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, a first write request to a log-based data store for a database may be performed by a first write node, in some embodiments. The write request may be performed in response to request to update (e.g., insert, modify, or delete) data in a database, in some embodiments. As discussed above with regard to FIGS. 2-7, the write request may be a request to write a log record to a change log for a database. In some embodiments, the write request may be a request to perform a write which the log-based data store may receive and generate a log record to describe the write request and store the log record in the log.

As indicated at 820, conflict indication(s) may be received for the write from the log-based data store, in some embodiments. For example, write acknowledgements may be received for a write to the log-based data store irrespective of whether a write conflicts with another write, in some embodiments. In such cases, the write acknowledgements may contain the conflict indications. In some embodiments, the log-based data store may implement multiple copies or replicas (e.g., a protection group of a segment as discussed above with regard to FIGS. 2-7). A conflict may be detected at the first write node based on whether a number of received conflict indications from the different copies written exceeds (or is equal to or greater than) some threshold number, in some embodiments. For example, if a group of 6 copies is written and 3 conflict indications are received and the threshold is 2, then a conflict may be detected. Note that in quorum-based systems for multiple copies, as those discussed above, write quorums may not necessarily be the same thresholds as thresholds for detecting conflicts. For example, if in a protection group of 5 copies, 3 out of 5 copies is sufficient for a write to achieve a write quorum, the number of conflict indications tolerated could be less than 2. In some embodiments, a write quorum may only be satisfied if a sufficient number of write acknowledgments without a conflict indication satisfy the write quorum.

For writes where no conflict is detected, as indicated by the negative exit from 820, the first write node may identify the request as committed to the database, in some embodiments, as indicated 822. As discussed below with regard to FIG. 9, in some embodiments, storage nodes may store a log record corresponding to the first write request until a further indication is received from the write node that the write request may be finalized (e.g., when the global lowest committed LSN value received from the heartbeat indication from the primary write node is greater than the LSN value of the log record).

As indicated by the positive exit from 820, for writes where a conflict is detected, the first write node may request a resolution of the conflict from a primary write node for the database, in some embodiments. For example, the request may indicate the write request to be performed, whether write request is performed as part of a transaction, an LSN value or other logical ordering indicator for the write request, the logical operation of the write request (e.g., what entries, rows, fields, objects, values are changed by the write request). The primary write node may apply a resolution scheme, as discussed below with regard to FIG. 10, and then return a resolution to the first write node, as indicated at 850. If the resolution indicates that the first write is to be committed, then as indicated at 860, the first write node may cause the log-based data store to commit the first write request, in various embodiments. For example, the first write node may send a commit instruction or request. If the resolution does not indicate that the first write is to be committed, then as indicated at 820, the first write node may cause the log-based data store to cancel the first write request, in some embodiments. For example, the first write node may send a cancellation or other instruction to ignore, delete, roll-back, or exclude the log record in the log for the write request, in some embodiments.

Figure 9:
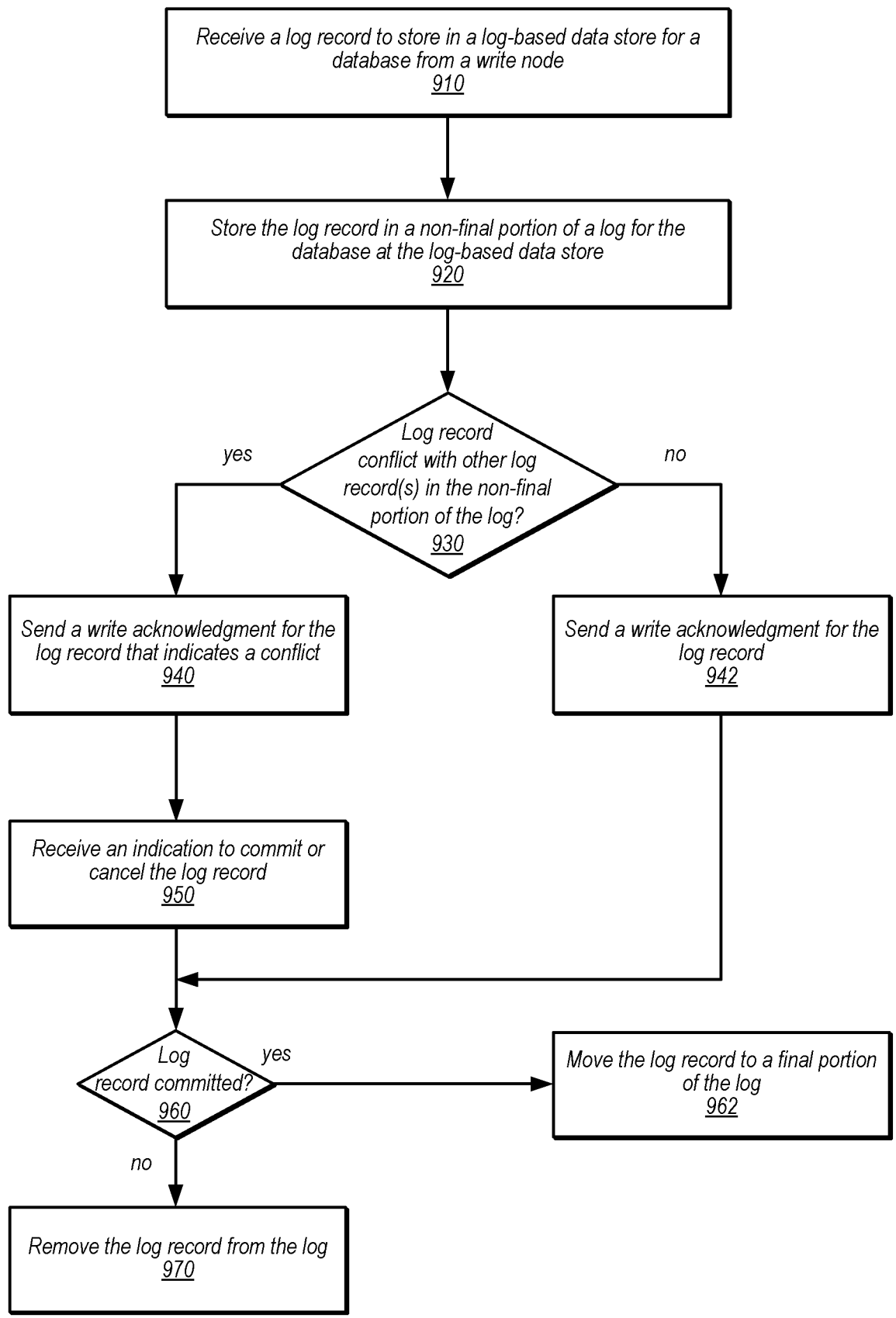
FIG. 9 is a high-level flow chart illustrating methods and techniques for storing log records in a log-based data store that detects write conflicts, according to some embodiments.

FIG. 9 is a high-level flow chart illustrating methods and techniques for storing log records in a log-based data store that detects write conflicts, according to some embodiments. As indicated at 910, a log record may be received from a write node to store in a log-based data store for a database, in some embodiments. For example, a redo log record describing a change to the database may be received, as discussed above with regard to FIGS. 1, 5, and 8. As indicated at 920, the log record may be stored in a non-final portion of a log for the database at the log-based data store, in some embodiments. For example, log records may be stored in an append section, so that log records are stored in the append section (e.g. a queue) as they are received (which may not be in order with respect to their LSN values).

As indicated at 930, an evaluation may be performed as to whether the log record conflicts with other log record(s) in the non-final portion of the log, in various embodiments. For example, a data page, entry, or other portion of the database associated with the log record may be compared to the data page, entry, or other portion of the other log record(s) in the non-final portion of the log. If the associated portions match or are the same (e.g., same data page), then a conflict may be detected between the log records, in some embodiments.

As indicated at 940, if the log record conflicts with other log record(s), a write acknowledgement for the log record may be sent to the write node which indicates a conflict. In some embodiments, the write acknowledgement may indicate the conflicting log record(s) and/or information for resolving the conflict between the log records (e.g., LSN value(s), write node(s) that performed the write(s), operation (s) described by the log record(s)). As indicated at 950 (and discussed above with regard to FIG. 8), an indication to commit or cancel the log record may be received, in some embodiments. If the log record is not committed, then as indicated by the negative exit from 960, the log record may be removed from the log, as indicated at 970, in some embodiments. For example, the log record may be deleted (or marked for deletion) from the non-final portion of the log, in some embodiments.

As indicated at 942, if the log record does not conflict, then an acknowledgement for the log record may be sent (without a conflict indication), in some embodiments. The log record may remain in the non-final portion of the log until an indication is received to finalize or commit the log record, as indicated by the positive exit from 960, in some embodiments. For example, in some embodiments, the log records of the non-final portion of the log may be indicated (e.g., by LSN value ranges) or sent to a write node which may then evaluate the non-final log records from each storage node in a protection group for a segment of a database volume to determine whether the log records are less than a globally lowest LSN value (exchanged via heartbeat communications). When the globally lowest LSN value is known and is greater than each of the log records in the non-final portion sent to the write node, then the write node may indicate to the storage nodes a range of LSN values which can be finalized in the log. As indicated at 962, the log record can be moved to a finalized portion of the log. For example, the log record may be recopied in logical order (e.g. LSN value order) to a portion of the log which may not be altered (or at least until garbage collection operations), in some embodiments.

As discussed above, a primary node may be able to resolve write conflicts detected by a log-based data store, in some embodiments. FIG. 10 is a high-level flow chart illustrating methods and techniques for resolving a conflict between multiple writes to database, according to some embodiments. As indicated at 1010, a resolution request for a conflict may be received between writes to a log-based data store for a database, in various embodiments. The request may indicate whether the write requests are performed as part of a transaction, LSN values or other logical ordering indicators for the write requests, and/or the logical operation of the write request (e.g., what entries, rows, fields, objects, values are changed by the write request).

In some embodiments, write requests may be identified by a physical conflict as to storage location. For example, if both write requests write to the same data page, then a physical conflict may exist. However, physical conflicts may not always be a conflict between the desired effects of the writes. For example, as indicated at 1020, a check may be performed as to whether there is a logical conflict between the writes, in some embodiments. A logical conflict may be a conflict in the logical operation to be performed (e.g., an operation on a same row, field, entry, value, or item of the database) by two or more transactions (or writes not performed as part of a transaction), in some embodiments. If, for instance the writes were to different column values in a same entry, then there may be no logical conflict. As indicated at 1050, if no logical conflict exists, then resolution(s) indicating that the conflicting writes succeed may be returned so that the log records for the conflicting writes may be committed.

As indicated at 1030, for writes that logically conflict, a conflict resolution scheme to select one of the writes to succeed may be performed, in some embodiments. For example, random selection techniques may be applied to randomly select one write to succeed. In some embodiments, other information such as whether the write is part of transaction and/or which transaction is longest running may determine the write selection. In some embodiments, conflict resolution history or balancing schemes may be maintained in order to ensure that no one write node succeeds more than other write nodes (e.g., so that each write node is able to make progress on writes). Once determined, the resolution(s) indicating the successful and failed write(s) may be returned, as indicated at 1040.

Figure 11:
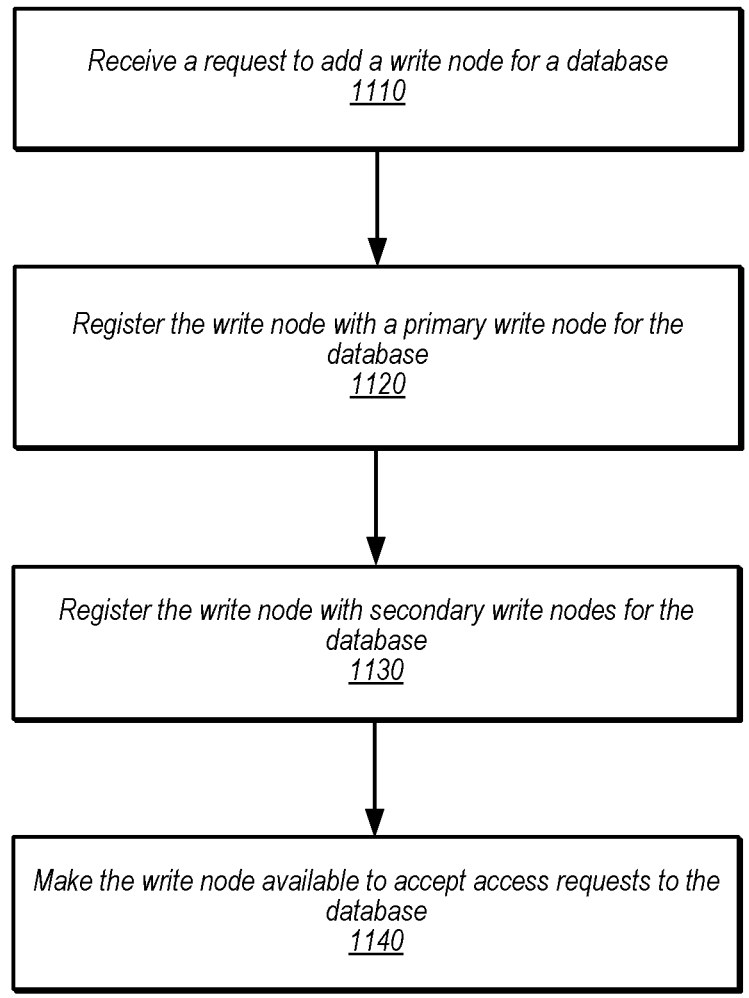
FIG. 11 is a high-level flow chart illustrating methods and techniques for adding a write node to a database, according to some embodiments.

In various embodiments, write nodes may be added or removed for a database. For example, write nodes may fail, and thus new write nodes may be added as a replacement, in some embodiments. Users may submit requests (e.g., via an API or graphical interface) to add or remove write nodes. In some embodiments, automated scaling or provisioning features may identify the need to increase or decrease write bandwidth to a database by adding or removing write nodes automatically. FIG. 11 is a high-level flow chart illustrating methods and techniques for adding a write node to a database, according to some embodiments.

As indicated at 1110, a request may be received to add a write node for a database, in some embodiments. The request may be received from a user or as part of a management system for the database (e.g., as part of automatically increasing write bandwidth for the database or replacing a failed write node). A write node may be provisioned from a pool of available write nodes, in some embodiments, which may be pre-configured with the appropriate software, operating, system, applications, security information or credentials or other data to begin processing access requests to the database, in some embodiments.

As indicated at 1120, the write node may be registered with a primary write node for the database, in some embodiments. For example, the write node may send a registration request to the primary write node, including identifying information (e.g., network address or other identifier). The primary node may update a membership list of write nodes for the database (e.g., for performing heartbeat communications, for performing recovery operations, etc.), in some embodiments, to include the new write node. The primary write node may return an acknowledgement and list of other write nodes (e.g., other secondary write nodes) for the database. As indicated at 1130, the write node may register with the secondary write nodes for the database, in some embodiments. In this way, the various communications discussed above with regard to FIG. 6, such as cache invalidations, may be performed, in some embodiments. The write node may open or otherwise obtain access to the data for the database (e.g., open the database volume using the client-side storage service driver), in some embodiments. Then, as indicated at 1140, the write node may be made available to accept access requests to the database. For example, the write node may begin processing queries and other requests to the database (e.g., requests that cause writes to the database), in some embodiments.

Similar techniques may be performed to remove a write node, in some embodiments. For example, the primary and secondary write nodes may be updated in order to cease heartbeat and page cache invalidations. The primary write node may remove the write node from the membership list for the database. In some embodiments, the write node may close or disconnect from the log-based data store. In some embodiments, the write node may begin rejecting or ignoring access requests.

Figure 12A:
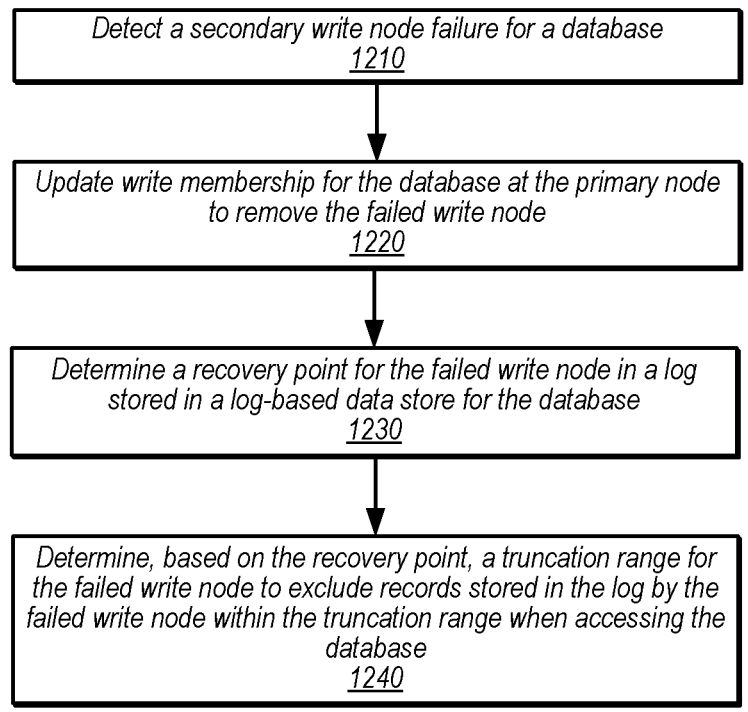
FIG. 12A is a high-level flow chart illustrating methods and techniques for handling secondary write node failure, according to some embodiments.

As noted above, write node failures may also occur. FIG. 12A is a high-level flow chart illustrating methods and techniques for handling secondary write node failure, according to some embodiments. As indicated at 1210, secondary write node failure for a database may be detected, in some embodiments. For example, the primary write node may not receive a heartbeat message from the write node for a period of time greater than a failure threshold amount. A secondary write node failure could be a network failure, such as a network partition that prevents communication between the secondary write node and the primary write node (or other secondary write nodes) or the log-based data store, in some embodiments. In some embodiments, secondary write node failure may be a process, application, or other software failure, or hardware failure that makes the secondary write node unavailable to continue processing access requests.

As indicated at 1220, write membership for the database at the primary node may be updated to remove the failed write node, in some embodiments. In this way, heartbeat communications may not be attempted (or cache invalidations), or other communications, with the failed write node. Other secondary write nodes may be notified, in some embodiments. As indicated at 1230, a recovery point for the failed write node may be determined in a log in a log-based data store for the database, in some embodiments. For example, as discussed above with regard to FIG. 7, the latest committed log record for the write node that is older than a completion point for the write node may be identified. As indicated at 1240, a truncation range for the failed write node may be determined based on the recovery point to exclude records stored in the log by the failed write node within the truncation range when accessing the database, in some embodiments. Subsequent log operations, such as coalesce operations, may ignore the truncated log records, in some embodiments, for example.

Figure 12B:
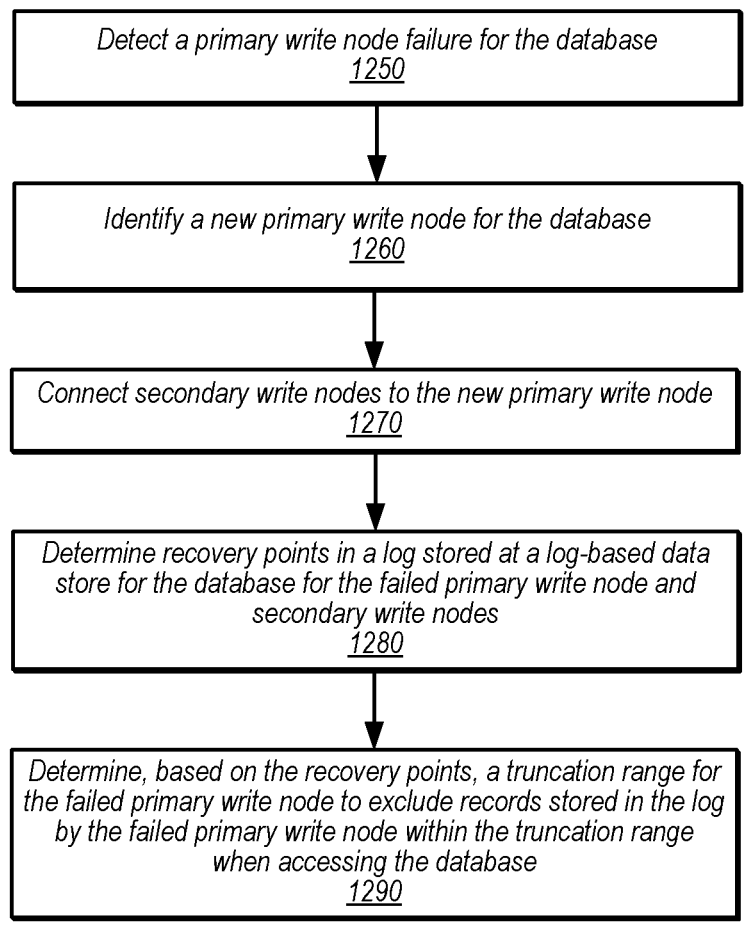
FIG. 12B is a high-level flow chart illustrating methods and techniques for handling primary write node failure, according to some embodiments.

FIG. 12B is a high-level flow chart illustrating methods and techniques for handling primary write node failure, according to some embodiments. As indicated at 1250, primary write node failure for a database may be detected, in some embodiments. For example, a secondary write node may not receive a heartbeat message from the primary write node for a period of time greater than a failure threshold amount. A primary write node failure could be a network failure, such as a network partition that prevents communication between the primary write node and secondary write node(s) or the log-based data store, in some embodiments. In some embodiments, primary write node failure may be a process, application, or other software failure, or hardware failure that makes the primary write node unavailable to continue processing access requests. In some embodiments, a determination may be made as to whether the primary write node failed alone or with secondary write nodes. For example, the primary write node may be restarted and continue to operate as primary write node if the other secondary write nodes also failed instead of identifying a new primary node as discussed below, in some embodiments.

As indicated at 1260, a new primary write node for the database may be identified, in some embodiments. For example, a management system may select one of the existing secondary write nodes to promote as a new primary write node or may provision and start up a new write node to serve as primary write node, in some embodiments. In some embodiments, remaining secondary write nodes may perform an election protocol to select a new primary write node. As indicated at 1270, the secondary write nodes may be connected or registered with the new primary write node, in some embodiments (e.g., by exchanging registration messages).

As indicated at 1280, recovery points in a log stored at a log-based data store for the failed primary write node and the secondary write nodes may be determined, in some embodiments. For example, as discussed above with regard to FIG. 7, the latest committed log record for the primary write node that is older than a completion point for the primary write node may be identified. Similarly, for each of the secondary write nodes, the latest committed log record for the secondary write node that is older than a completion point for the secondary node may be identified, in some embodiments. As indicated at 1240, a truncation range for the primary write node may be determined based on the recovery points to exclude records stored in the log by the failed primary write node within the truncation range when accessing the database, in some embodiments. Subsequent log operations, such as coalesce operations, may ignore the truncated log records, in some embodiments, for example.

Figure 13:
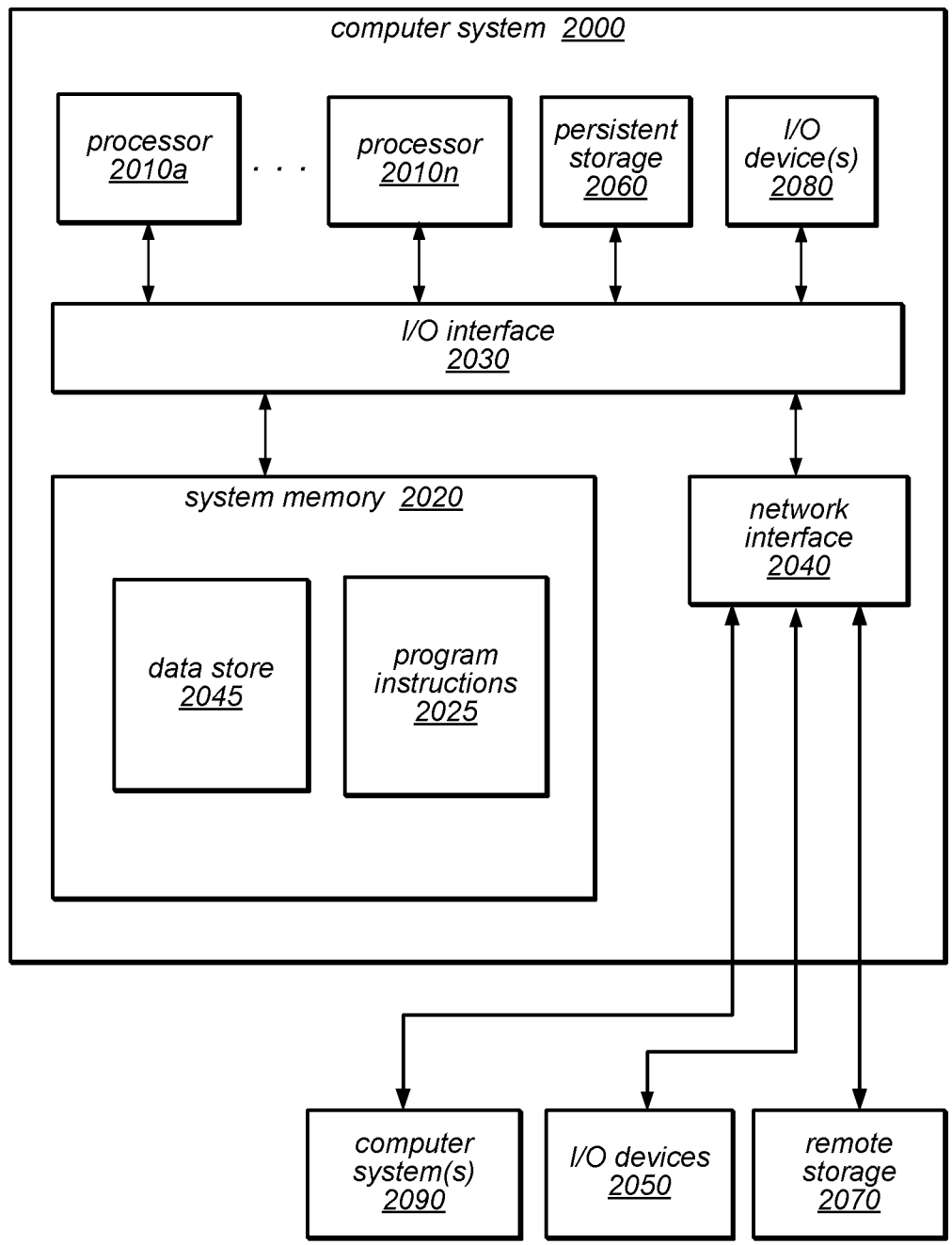
FIG. 13 is a block diagram illustrating an example computer system, according to some embodiments.

FIG. 13 is a block diagram illustrating an example computer system, according to some embodiments. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 660, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that store instructions and data accessible by processor(s) 2010. In various embodiments, system memories 2020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
a memory to store program instructions which, if performed by at least one processor, cause the at least one processor to implement a first database engine head node configured to:
receive an access request from a client;
responsive to receiving the access request, send a first write request to a log-based data store for a database to perform the access request on behalf of the client, the first write request comprising an update to data of the database;

receive, from the log-based data store, a response to the first write request comprising one or more indications of a detected conflict at the log-based data store between the update to the data of the database of the first write request and another update to the data of the database of a second write request to the database sent to the log-based data store by a second database engine head node, the one or more indications of the detected conflict indicating that the first write request sent to the log-based data store conflicts with the second write request sent to the log-based data store;

request a resolution of the indicated conflict from a primary database engine head node for the database;

cause the log-based data store to commit the first write request instead of the second write request according to the resolution received from the primary database engine head node indicating the first write request is to be committed; and acknowledge the access request to the client.

2. The system of claim 1, wherein the program instructions cause the at least one processor to further implement the method to at least:

receive a request to add the first database engine head node to the database; and responsive to the request to add the first database engine head node, make the first database engine head node available to accept access requests to the database.

3. The system of claim 1, wherein the program instructions cause the at least one processor to further implement the method to at least:

perform, by the first database engine head node, a third write request to the log-based data store, the third write request comprising a third update to other data of the database;

receive, at the first database engine head node subsequent to performing the third write request, one or more indications of a detected conflict at the log-based data store between the third update to the other data of the database of the third write request and a fourth update to the other data of the database of a fourth write request to the database sent by the second database engine head node;

request, by the first database engine head node, a resolution of the conflict between the third write request and the fourth write request from the primary database engine head node for the database; and cause, by the first database engine head node, the log-based data store to cancel the third write request according to the resolution received from the primary database engine head node indicating the third write request failed.

4. The system of claim 1, wherein the at least one processor is implemented as part of a network-based database service that includes the first database engine head node, the second database engine head node, and the primary database engine head node that provides access to the database, wherein the log-based data store is a separate storage service, and wherein the client is a client of the network-based database service.

5. A method, comprising:

performing by a first database engine head node:

sending, responsive to receiving an access request from a client, a first write request to a log-based data store for a database to perform the access request on behalf of the client, the first write request comprising an update to data of the database;

receiving, from the log-based data store, a response to a first write request comprising one or more indications of a detected conflict at the log-based data store between the update to the data of the database and another update to the data of the database a second write request to the database sent to the log-based data store by a second database engine head node, the one or more indications of the detected conflict indicating that the first write request sent to the log-based data store conflicts with the second write request sent to the log-based data store;

requesting a resolution of the indicated conflict from a primary write database engine head node for the database;

receiving a resolution from the primary write database engine head node indicating the first write request is to be committed; and causing the log-based data store to commit the first write request instead of the second write request according to the resolution received from the primary database engine head node.

6. The method of claim 5, further comprising:

determining that the one or more indications of a detected conflict exceed a minimum number of conflicts from different respective storage nodes of the log-based data store; and responsive to the determining, performing the requesting the resolution of the conflict from the primary database engine head node.

7. The method of claim 5, further comprising:

detecting failure of the primary database engine head node for the database;

identifying a new primary database engine head node for the database, wherein the new primary write database engine head node is the first database engine head node;

connecting the new primary database engine head node with one or more available secondary database engine head nodes, including the second database engine head node;

determining respective recovery points for the failed primary database engine head node and secondary database engine head nodes in a log stored in the log-based data store for the database; and determining a truncation range for the failed primary database engine head node to exclude one or more records stored in the log by the failed primary database engine head node.

8. The method of claim 5, further comprising:

detecting a failure of the first database engine head node; updating write membership for the database at the primary node to remove the failed database engine head node;

determining a recovery point for the failed database engine head node in a log stored in a log-based data store for the database; and determining, based on the recovery point, a truncation range for the failed database engine head node to exclude records stored in the log by the failed database engine head node within the truncation range when accessing the database.

9. The method of claim 5, wherein the second database engine head node is the primary database engine head node.

10. The method of claim 5, further comprising:

determining, by the primary database engine head node, that the conflict between the first write request and the second write request is an attempt to write different data within a same storage location; and responsive to the determining:
returning, by the primary database engine head node, the resolution to the first database engine head node to commit a reconciled version of the first write request and second write request to the log-based data store.

11. The method of claim 5, further comprising:
receiving a request to add a database engine head node to the database; and
responsive to the request to add the database engine head node to the node, making a third database engine head node available to accept access requests to the database.

12. The method of claim 5, further comprising:
performing, by the first database engine head node, a third write request to the log-based data store for the database; and
identifying, by the first database engine head node, the third write request as committed to the database responsive after receiving no conflict indications for the third write request from the log-based data store.

13. The method of claim 5, further comprising:
requesting, by the second database engine head node, the resolution of the conflict from the primary database engine head node for the database; and
receiving, at the second database engine head node the resolution from the primary database engine head node indicating the second write request failed; and
causing, by the second database engine head node, the log-based data store to cancel the second write request.

14. A non-transitory, computer-readable storage medium, storing program instructions that when executed by one or more computing devices cause the one or more computing devices to implement:
performing, by a first database engine head node:
sending, responsive to receiving an access request from a client, a first write request to a log-based data store for a database to perform the access request on behalf of the client, the first write request comprising an update to data of the database;
receiving, from the log-based data store, a response to the first write request comprising one or more indications of a detected conflict at the log-based data store between the update to the data of the database of the first write request to the database sent by the first database engine head node and another update to the data of the database of a second write request to the database sent by a second database engine head node;
requesting a resolution of the conflict from a primary database engine head node for the database;
receiving a resolution from the primary database engine head node indicating the first write request is to be committed; and
causing the log-based data store to commit the first write request instead of the second write request according to the resolution received from the primary database engine head node.

15. The non-transitory, computer-readable storage medium of claim 14, wherein the program instructions cause the one or more computing devices to further implement:
detecting a failure of the first database engine head node;
updating write membership for the database at the primary node to remove the failed database engine head node;
determining a recovery point for the failed database engine head node in a log stored in a log-based data store for the database; and
determining, based on the recovery point, a truncation range for the failed database engine head node to exclude records stored in the log by the failed database engine head node within the truncation range when accessing the database.

16. The non-transitory, computer-readable storage medium of claim 14, wherein the program instructions cause the one or more computing devices to further implement:
performing, by the first database engine head node, a third write request to the log-based data store;
receiving, at the first database engine head node, one or more indications of a detected conflict at the log-based data store between the third write request and a fourth write request to the database sent by the second database engine head node;
requesting, by the first database engine head node, a resolution of the conflict between the third write request and the fourth write request from the primary database engine head node for the database; and
causing, by the first database engine head node, the log-based data store to cancel the third write request according to the resolution received from the primary database engine head node indicating the third write request failed.

17. The non-transitory, computer-readable storage medium of claim 14, wherein the program instructions cause the one or more computing devices to further implement:
receiving a request to remove the second database engine head node from the database;
responsive to the request to remove the second database engine head node:
updating membership for the database at the primary database engine head node to remove the second database engine head node; and
making the second database engine head node unavailable to access the database.

18. The non-transitory, computer-readable storage medium of claim 14, wherein the program instructions cause the one or more computing devices to further implement assigning respective ranges of logical sequence numbers for a log stored in the log-based data store to the first database engine head node and the second database engine head node, wherein the first write request is associated with a first logical sequence number in the respective range of logical sequence numbers assigned to the first database engine head node and wherein the second write request is associated with a second logical sequence number in the respective range of logical sequence numbers assigned to the second database engine head node.

19. The non-transitory, computer-readable storage medium of claim 14, wherein the program instructions cause the one or more computing devices to further implement:
performing, by the first database engine head node, a third write request to the log-based data store for the database; and
identifying, by the first database engine head node, the third write request as committed to the database responsive after receiving no conflict indications as part of one or more write acknowledgments received for the third write request from the log-based data store.

20. The non-transitory, computer-readable storage medium of claim 14, wherein the one or more computing devices are implemented as part of a network-based database service that includes the first database engine head node, the second database engine head node, and the primary database engine head node, wherein the first write request is received from a first client of the database service at the first database engine head node and wherein the second write request is received from a second client of the database service at the second database engine head node.

* * * * *